(12) United States Patent
Noutary et al.

(10) Patent No.: US 8,911,853 B2
(45) Date of Patent: Dec. 16, 2014

(54) PRINTING INK

(75) Inventors: Carole Noutary, Broadstairs (GB); Jeremy Ward, Broadstairs (GB)

(73) Assignee: Sericol Limited (GB)

( * ) Notice: Subject to any disclaimer, the term of this patent is extended or adjusted under 35 U.S.C. 154(b) by 103 days.

(21) Appl. No.: 13/391,374

(22) PCT Filed: Aug. 20, 2010

(86) PCT No.: PCT/GB2010/051383
§ 371 (c)(1), (2), (4) Date: May 1, 2012

(87) PCT Pub. No.: WO2011/021051
PCT Pub. Date: Feb. 24, 2011

(65) Prior Publication Data
US 2012/0207985 A1 Aug. 16, 2012

(30) Foreign Application Priority Data
Aug. 21, 2009 (GB) .................................. 0914653.1

(51) Int. Cl.
B41J 2/175 (2006.01)
C09D 11/36 (2014.01)
C09D 11/322 (2014.01)
C09D 11/50 (2014.01)
C09D 11/101 (2014.01)

(52) U.S. Cl.
CPC ............. *C09D 11/36* (2013.01); *C09D 11/322* (2013.01); *C09D 11/50* (2013.01); *C09D 11/101* (2013.01)
USPC ............. 428/195.1; 522/79; 347/102; 347/86

(58) Field of Classification Search
USPC ................................. 523/160, 161
See application file for complete search history.

(56) References Cited

U.S. PATENT DOCUMENTS

| 4,303,924 | A | 12/1981 | Young |
| 2008/0063981 | A1* | 3/2008 | Ohnishi .................... 430/302 |
| 2009/0099277 | A1 | 4/2009 | Nagvekar et al. |

FOREIGN PATENT DOCUMENTS

| EP | 1 829 680 A1 | 9/2007 |
| EP | 2 184 329 | 5/2010 |
| GB | 2423520 A | 8/2006 |
| GB | 2423521 A | 8/2006 |
| WO | 97/31071 A1 | 8/1997 |
| WO | 02/38687 A1 | 5/2002 |
| WO | 2006/041003 A1 | 4/2006 |
| WO | 2007/017644 A1 | 2/2007 |
| WO | 2007/020644 A1 | 2/2007 |
| WO | 2007/036692 A1 | 4/2007 |
| WO | 2009/024640 A1 | 2/2009 |

OTHER PUBLICATIONS

International Search Report (ISR) issued in the International Application No. PCT/GB2010/051383.
International Preliminary Report on Patentability (IPRP) issued in the International Application No. PCT/GB2010/051383.
Search Report issued in the priority UK application GB 0914653.1.
English translation of Office Action in corresponding Japanese Patent Application No. 2012-525215.

\* cited by examiner

*Primary Examiner* — Doris Lee
(74) *Attorney, Agent, or Firm* — Wood, Phillips, Katz, Clark & Mortimer

(57) ABSTRACT

The present invention provides an inkjet ink comprising 5 to 30% by weight of organic solvent based on the total weight of the ink, a radiation curable monofunctional monomer, a radiation curable multifunctional monomer, a photoinitiator and a colourant.

11 Claims, No Drawings

PRINTING INK

This application is filed under 35 U.S.C. §371 as the U.S. National Stage of International Application PCT/GB2010/051383, filed Aug. 20, 2010, which claims priority of the United Kingdom Patent Application No. 0914653.1, filed on Aug. 21, 2009, the contents of which are hereby incorporated by reference in their entirety.

FIELD OF THE INVENTION

This invention relates to a printing ink and in particular to an ink for use in inkjet printers.

BACKGROUND OF THE INVENTION

Inkjet printing is becoming an increasing popular technique for the production of graphic images for advertising and the like. An inkjet printer comprises a printhead that includes a series of nozzles which eject ink onto a substrate. Two main ink chemistries are used in the art: inks that dry by exposure to ultraviolet radiation and inks that dry by solvent evaporation.

Inks that dry by exposure to UV radiation comprise a UV curable carrier that polymerises, or crosslinks, on exposure to UV light to form a crosslinked polymer film. These inks dry quickly, adhere to a wide range of substrates, and provide printed films with good solvent resistance. However, UV curable inks have relatively high viscosities and are therefore generally heated at the printhead in order to reduce the viscosity of the ink sufficiently so that the ink can be jetted. For example, a UV curable ink that has a viscosity of 20 to 22 mPas at 25° C. would be heated to around 38 to 45° C. at the printhead in order to reduce the viscosity to less than 10 mPas. This requirement for heating adds complexity to the printhead which means that currently available printheads for use with UV curable inks are relatively expensive and more complex engineering is required to achieve the desired reliability. Printheads that are adapted to print this type of ink include the Dimatix SE128 and the Toshiba Tec CA4 drop-on-demand piezo print heads.

Because of their intrinsically low viscosity, solvent-based inkjet inks do not need to be heated in order to be jetted satisfactorily at the inkjet printhead; indeed some lower cost printheads simply cannot be heated. The printheads used to print solvent-based inkjet inks are therefore typically lower cost, such as the drop-on-demand piezo print heads made by Epson. However, current solvent-based inkjet inks may not adhere to certain types of substrate, particularly non-porous substrates such as plastics, and the printed films have poor resistance to solvents.

There therefore exists a need for an inkjet ink that has good solvent resistance and that can be printed on a wide range of substrates, but which can be printed without the need for heating at the printhead and can therefore be used with currently available, low cost printheads.

BRIEF SUMMARY OF THE INVENTION

Accordingly, the present invention provides an inkjet ink comprising 5 to 30% by weight of organic solvent-based on the total weight of the ink, a radiation curable monofunctional monomer, a radiation curable multifunctional monomer, a photoinitiator and a colourant.

DETAILED DESCRIPTION OF THE INVENTION

The inks of the present invention preferably have a viscosity of 15 mPas or less at 25° C., preferably 10 mPas or less and most preferably 7 mPas or less. Viscosity can be measured using a Brookfield DV1 low-viscosity viscometer running at 20 rpm at 25° C. with spindle S00.

The presence of an organic solvent in the ink of the present invention reduces the viscosity of the ink, which allows the ink to be jetted from a printhead operating at ambient temperature. This means that the inks of the present invention can be jetted using a wider range of currently available printheads such as those that are typically used for printing solvent-based inkjet inks. Examples of such printheads includes the Epson drop-on-demand piezo print heads. However, the inks of the invention surprisingly maintain the advantageous properties of UV curable inkjet inks such as good adhesion to a wide range of substrates and good solvent resistance in the printed film.

The presence of an organic solvent in the inks of the invention is also expected to provide the printed images with improved flexibility and higher gloss when compared to known UV curable inks.

The inks of the present invention include an organic solvent. The organic solvent is in the form of a liquid at ambient temperatures and is capable of acting as a carrier for the remaining components of the ink. The organic solvent component of the inks of the invention may be a single solvent or a mixture of two or more solvents. As with known solvent-based inkjet inks, the organic solvent used in the ink of the present is required to evaporate from the printed ink, typically on heating, in order to allow the ink to dry.

The organic solvent may be selected from any solvent that is typically used in the printing industry, such as glycol ethers, glycol ether esters, alcohols, ketones, esters and mixtures thereof. Other suitable solvents include organic carbonates.

Solvents having a boiling point of greater than 100° C. are preferred. Examples include 1-methoxy-2-propanol, diethylene glycol diethyl ether, 2-butoxyethylacetate and propylene carbonate. The use of a low volatility solvent or solvent mixture minimises evaporation from ink in the inkjet nozzle when the printer is inactive, which prevents the formation of encrusted deposits that can lead to blocked or deviated nozzles.

The solvent is present in the ink in an amount of 5 to 30% by weight, based on the total weight of the ink, preferably 7 to 25%, more preferably 11 to 20%.

In one embodiment the organic solvent is a low toxicity and/or a low odour solvent. Solvents that have been given VOC exempt status by the United States Environmental Protection Agency or European Council are preferred.

Other solvents may be included in the organic solvent component. For example, solvents such as 2-ethylhexyl acetate may be introduced as part of commercially available pigment dispersions. Solvent may also be introduced with commercially available polymeric dispersants such as Byk 168.

The ink of the present invention is preferably substantially free of water, although some water will typically be absorbed by the ink from the air or be present as impurities in the components of the inks, and such levels are tolerated. For example, the ink may comprise less than 5% by weight of water, more preferably less than 2% by weight of water and most preferably less than 1% by weight of water, based on the total weight of the ink.

Any radiation curable mono- and multifunctional monomers that are suitable for use in an inkjet ink may be used in the ink of the invention and such monomers are well known in the art. The ink comprises one or more monofunctional monomers and one or more multifunctional monomers.

The radiation curable monomers may polymerise by cationic polymerisation in which cases the mono- and multifunctional monomers can be selected from epoxides, allyl ethers, vinyl ethers, oxetanes and hydroxy-containing compounds, for example.

Preferably, however, the mono- and multifunctional monomers polymerise by free radical polymerisation.

Suitable free radical polymerising monofunctional monomers include monofunctional (meth)acrylates, N-vinyl amides, N-acryloylamines, $\alpha,\beta$-unsaturated ether monomers and mixtures thereof.

Monofunctional (meth)acrylate monomers are well known in the art. Preferably the monofunctional (meth)acrylate monomers are esters of acrylic acid. Preferred examples include phenoxyethyl acrylate (PEA), cyclic TMP formal acrylate (CTFA), isophoryl acrylate, isobornyl acrylate (IBOA), tetrahydrofurfuryl acrylate (THFA), 2-(2-ethoxyethoxy)ethyl acrylate, octyl-decyl acrylate (ODA), tridecyl acrylate (TDA), isodecyl acrylate (IDA) and lauryl acrylate. PEA, 2-(2-ethoxyethoxy)ethyl acrylate and mixtures thereof are particularly preferred.

N-vinyl amides and N-(meth)acryloyl amines may also be used in the inks of the invention. N-vinyl amides are well-known monomers in the art and a detailed description is therefore not required. N-vinyl amides have a vinyl group attached to the nitrogen atom of an amide which may be further substituted in an analogous manner to well known (meth)acrylate monomers. Preferred examples are N-vinyl caprolactam (NVC) and N-vinyl pyrrolidone (NVP). Similarly, N-acryloyl amines are also well-known in the art. N-acryloyl amines also have a vinyl group attached to an amide but via the carbonyl carbon atom and again may be further substituted in an analogous manner to known (meth) acrylate monomers. A preferred example is N-acryloylmorpholine (ACMO).

Suitable $\alpha,\beta$-unsaturated ether monomers include vinyl ethers such as ethylene glycol monovinyl ether.

The total amount of radiation curable monofunctional monomer is preferably 20 to 80% by weight, more preferably 30 to 70%, based on the total weight of the ink.

Preferred multifunctional monomers are (meth)acrylate monomers and $\alpha,\beta$-unsaturated ether monomers. Di-, tri- and tetra-functional monomers are preferred. Examples of the multifunctional acrylate monomers that may be included in the ink-jet inks include hexanediol diacrylate, trimethylolpropane triacrylate, pentaerythritol triacrylate, polyethyleneglycol diacrylate (for example tetraethyleneglycol diacrylate), dipropyleneglycol diacrylate, tri(propylene glycol) triacrylate, neopentylglycol diacrylate, bis(pentaerythritol) hexaacrylate, and the acrylate esters of ethoxylated or propoxylated glycols and polyols, for example, propoxylated neopentyl glycol diacrylate, ethoxylated trimethylolpropane triacrylate, and mixtures thereof. Particularly preferred are di- and trifunctional acrylates.

In addition, suitable multifunctional monomers include esters of methacrylic acid (i.e. methacrylates), such as hexanediol dimethacrylate, trimethylolpropane trimethacrylate, triethyleneglycol dimethacrylate, diethyleneglycol dimethacrylate, ethyleneglycol dimethacrylate, 1,4-butanediol dimethacrylate. Mixtures of (meth)acrylates may also be used.

Suitable $\alpha,\beta$-unsaturated ether monomers include vinyl ethers. Examples are well known in the art and include triethylene glycol divinyl ether, diethylene glycol divinyl ether and 1,4-cyclohexanedimethanol divinyl ether. Mixtures of $\alpha,\beta$-unsaturated ether monomers may be used.

The presence of a multifunctional monomer in the ink of the invention is believed to provide the final printed film with superior solvent resistance and toughness.

The total amount of radiation curable multifunctional monomer is preferably 5 to 60% by weight, more preferably 10 to 50% by weight, more preferably 15 to 40%, most preferably 20 to 40%, based on the total weight of the ink.

In one embodiment of the invention, the ink comprises at least one $\alpha,\beta$-unsaturated ether monomer and at least one (meth)acrylate monomer.

(Meth)acrylate is intended herein to have its standard meaning, i.e. acrylate and/or methacrylate. Mono- and multifunctional are also intended to have their standard meanings, i.e. one and two or more groups, respectively, which take part in the polymerisation reaction on curing.

The radiation curable monomers used in the ink of the invention preferably have molecular weight of 450 or less. In a preferred embodiment, the ink of the invention comprises less than 10% by weight, more preferably less than 5% by weight of radiation curable material that has a molecular weight of greater than 450, based on the total weight of the ink. Most preferably, the ink is substantially free of radiation curable material that has a molecular weight of greater than 450.

Furthermore, preferred inks of the invention are substantially free of non reactive, or passive, resin binder. By "non reactive, or passive, resin binder" is meant a resin material that does not include reactive groups that are able to crosslink on exposure to radiation. In other words, non reactive or passive resin binders are not radiation curable materials. Resin binders typically have a molecular weight of 10,000-100,000 (as determined by GPC with polystyrene standards) and are used in known solvent-based inks to improve the solvent resistance of the printed film. The inks of the invention include radiation curable material which is able to crosslink in order to provide a solvent resistant film, however, and a resin binder is not therefore required. The absence of a relatively high molecular weight resin binder in the preferred inks of the invention means that very low viscosity inks can be provided.

By "substantially free of" is meant that only trace amounts of material may be present. These trace amounts may be introduced into the ink for example as impurities in commercially available radiation curable monomers, or components in commercially available pigment dispersions.

The ink of the invention includes one or more photoinitiators. When the ink of the invention includes a free radical polymerisable material the photoinitiator system includes a free radical photoinitiator and when the ink includes a cationic polymerisable material the photoinitiator system includes a cationic photoinitiator.

The free radical photoinitiator can be selected from any of those known in the art. For example, benzophenone, 1-hydroxycyclohexyl phenyl ketone, 1-[4-(2-Hydroxyethoxy)-phenyl]-2-hydroxy-2-methyl-1-propane-1-one, 2-benzyl-2-dimethylamino-(4-morpholinophenyl)butan-1-one, isopropyl thioxanthone, benzil dimethylketal, phenyl bis(2,4,6-trimethyl benzoyl) phosphine oxide, (2,4,6-trimethylbenzoyl) diphenylphosphine oxide or mixtures thereof. Such photoinitiators are known and commercially available such as, for example, under the trade names Irgacure and Darocur (from Ciba) and Lucerin (from BASF).

In the case of a cationically curable system, any suitable cationic initiator can be used, for example sulphonium or iodonium based systems. Non limiting examples include Rhodorsil PI 2074 from Rhodia; MC AA, MC BB, MC CC, MC CC PF, MC SD from Siber Hegner; UV9380c from Alfa Chemicals; Uvacure 1590 from UCB Chemicals; and Esacure 1064 from Lamberti spa.

Preferably the photoinitiator is present in an amount of 1 to 20% by weight, preferably 4 to 10% by weight, based on the total weight of the ink.

The ink comprises at least one colourant. The colourant may be either dissolved or dispersed in the liquid medium of the ink. Preferably the colourant is a dispersible pigment, of the types known in the art and commercially available such as under the trade-names Paliotol (available from BASF plc), Cinquasia, Irgalite (both available from Ciba Speciality Chemicals) and Hostaperm (available from Clariant UK). The pigment may be of any desired colour such as, for example, Pigment Yellow 13, Pigment Yellow 83, Pigment Red 9, Pigment Red 184, Pigment Blue 15:3, Pigment Green 7, Pigment Violet 19, Pigment Black 7. Especially useful are black and the colours required for trichromatic process printing. Mixtures of pigments may be used.

Pigment particles dispersed in the ink should be sufficiently small to allow the ink to pass through an inkjet nozzle, typically having a particle size less than 8 µm, preferably less than 5 µm, more preferably less than 1 µm and particularly preferably less than 0.5 µm.

Commercially available pigment dispersions tend to comprise around 40 to 50% by weight of solvent or carrier based on the total weight of the pigment dispersion and the pigment dispersion typically makes up around 2 to 20% by weight of the ink and sometimes more.

The colourant is preferably present in an amount of 1 to 10% by weight, based on the total weight of the ink.

Other components of types known in the art may be present in the ink to improve the properties or performance. These components may be, for example, surfactants, defoamers, dispersants, synergists for the photoinitiator, stabilisers against deterioration by heat or light, reodorants, flow or slip aids, biocides and identifying tracers.

The ink of the present invention can be printed using any inkjet printer that is suitable for printing solvent-based ink jet inks. A source of radiation is required in order to cure the radiation curable monomers, however.

Ink-jet printers comprise a printhead that includes a series of nozzles through which ink is ejected onto a substrate. The printhead is typically provided on a carriage that traverses the print width (moves back and forth across the substrate) during the printing process.

Preferably, the ink of the invention is jetted on to a substrate using a printhead for solvent-based inkjet inks, such as an Epson drop-on-demand piezo printhead. Printheads for solvent-based inks do not include a means for heating the ink in the printhead. In this embodiment, the ink is not heated at the printhead and therefore remains at ambient temperature while in the printhead and during jetting.

The ink of the invention is preferably jetted at less than 35° C., more preferably less than 30° C., and most preferably at about 25° C.

The ink of the present invention dries by a combination of evaporation of the organic solvent, and curing of the radiation curable monomers upon exposure to actinic radiation. The evaporation and the curing steps can take place in any sequence including simultaneously.

The solvent is evaporated from the printed ink using known methods, preferably by heating the printed ink. Heat may be applied through the substrate and/or from above the substrate, for example by the use of heated plates provided under the substrate or radiant heaters provided above the substrate. In one example, the ink is jetted onto a preheated substrate that then moves over a heated platen.

The radiation curable monomers that are included in the ink of the invention are cured by exposing the ink to actinic radiation, preferably UV radiation. Sources of UV radiation are known to the person skilled in the art and include mercury discharge lamps, flash lamps and light emitting diodes (LEDs). One or more radiation sources may be used. The UV source may be a static lamp, or the source can placed on a carriage that allows the source to move across the print width, for example. The source can be provided on the same carriage as the printhead, or can be provided on a separate carriage.

When a mercury discharge lamp is used as a UV source, typically no separate solvent evaporation step is required because evaporation of the organic solvent provided in the ink can be achieved by exposure to the infra red portion of the radiation that is emitted from the mercury discharge lamp.

In one embodiment of the invention, the radiation curable material is cured in two steps. In the first step, the radiation curable material is partially cured in order to "pin" the ink to the substrate. This partial cure can be achieved, for example, by providing a source of UV radiation such as an LED array on the carriage that moves the printhead back and forth across the substrate. It is understood that the surface of the printed ink is still able to flow to some extent after partial cure, which may contribute to improved gloss in the final printed image. The ink is then exposed to a further dose of radiation in order to substantially complete the cure and solidify the ink. This second cure step can be achieved using a second radiation source, such as a static radiation source that is positioned downstream from the printer carriage. In this embodiment of the invention, the solvent evaporation step can take place before the pinning step, between the pinning step and full cure step, or after the full cure step. Alternatively, the solvent evaporation can take place simultaneously with one of the curing steps.

The nature of the substrate is not limited and includes any substrate which may be subjected to inkjet printing. However, the inks of the present invention are particularly suited for printing onto substrates such as styrene, PolyCarb (a polycarbonate), BannerPVC (a PVC) and VIVAK (a polyethylene terephthalate glycol modified).

The present invention also provides a method of inkjet printing as described above, and a substrate having the printed ink thereon. The ink of the present invention is particularly suited to piezoelectric drop-on-demand inkjet printing.

The present invention further provides a printing apparatus and an inkjet ink cartridge containing an inkjet ink as defined herein. The cartridges comprise an ink container and an ink delivery port which is suitable for connection with an inkjet printer.

The inks of the present invention may be prepared by known methods such as stirring with a high-speed water-cooled stirrer, or milling on a horizontal bead-mill.

The invention will now be described with reference to the following examples, which are not intended to be limiting.

EXAMPLES

Cyan and black inkjet ink formulations according to the invention (Examples 1 and 2) having the compositions shown in Table 1 were prepared by mixing the components in the given amounts. Amounts are given as weight percentages based on the total weight of the ink.

The inks were drawn down onto semi-rigid 220 µm PVC using a no 2 Kbar, depositing a wet film weight of 12 microns. The ink of Example 1 was cured by exposing the printed film to a medium pressure mercury lamp providing a UV dose of 400 mJ/cm². The ink of Example 2 was cured by exposing the printed film to a medium pressure mercury lamp providing a UV dose of 600 mJ/cm².

The relative solvent resistance of the cured prints was assessed by rubbing with a soft cloth soaked in isopropyl alcohol. The number of double rubs required to break through to the substrate was recorded in each case (100 maximum).

The adhesion of the dried prints to the substrate was tested by scoring the print with a cross-hatch tester to produce a number of squares. 3M pressure sensitive Scotch-tape was applied to the scored film and then removed. The number of squares of ink removed with the tape was counted and the level of adhesion was rated 1 (poor) to 5 (good).

The results are shown in Table 2.

It can be seen that the inks of the invention have significantly lower viscosities than currently available UV curable inks, that typically have viscosities of 20 to 30 mPas at 25° C., but the inks of the invention maintain the advantageous properties of UV curable inks such as adhesion to non-porous substrates, for example PVC, and good solvent resistance of the printed film.

TABLE 1

|  | Example 1 | Example 2 |
| --- | --- | --- |
| Phenoxy ethyl acrylate | 17.8 | 16.3 |
| N-vinyl caprolactam | 14.5 | 13.4 |
| Carbitol acrylate | 8.4 | 7.9 |
| Hexane diol diacylate | 33.8 | 32 |
| Cyan pigment dispersion | 3.8 | — |
| Black pigment dispersion | — | 4.4 |
| Irgacure 819 | 3.4 | 3.2 |
| Irgacure 2959 | 1.7 | 1.6 |
| Irgacure 369 | 0.9 | 0.8 |
| 1-methoxy 2-propanol | 15 | 20 |
| Stabiliser ST-1 | 0.7 | — |
| TegoRad 2100 | — | 0.4 |
| Total | 100 | 100 |
| Viscosity at 25° C./mPas | 5.6 | 5.5 |

TABLE 2

|  | Example 1 | Example 2 |
| --- | --- | --- |
| Solvent resistance | 100+ | 100+ |
| Adhesion to PVC | 5 | 5 |

What is claimed is:

1. An inkjet ink comprising 7 to 30% by weight of organic solvent, based on the total weight of the ink, a radiation curable monofunctional monomer, a radiation curable multifunctional monomer, a photoinitiator and a dispersible pigment, wherein the ink has a viscosity of 7 mPas or less at 25° C., wherein the organic solvent is selected from glycol ethers, glycol ether esters, alcohols, ketones, organic carbonates and mixtures thereof.

2. The ink according to claim 1 wherein the organic solvent has a boiling point of greater than 100° C.

3. The ink according to claim 1 wherein the organic solvent is present in an amount of 7 to 25% by weight based on the total weight of the ink.

4. The ink according to claim 1 comprising less than 5% by weight of water, preferably less than 2% by weight of water and more preferably less than 1% by weight of water, based on the total weight of the ink.

5. The ink according to claim 1 wherein the radiation curable monofunctional monomer is present in an amount of 20 to 80% by weight, preferably 30 to 70%, based on the total weight of the ink.

6. The ink according to claim 1 wherein the radiation curable multifunctional monomer is present in an amount of 5 to 60% by weight, preferably 10 to 50% by weight, more preferably 20 to 40%, based on the total weight of the ink.

7. The ink according to claim 1 wherein the radiation curable monomers have a molecular weight of 450 or less.

8. The ink according to claim 1 that is substantially free of radiation curable material that has a molecular weight of greater than 450.

9. The ink according to claim 1 that is substantially free of resin binder.

10. The ink according to claim 1 wherein the radiation curable monomers are capable of polymerising by radical polymerisation.

11. The ink according to claim 10 wherein the radiation curable monofunctional monomer is selected from monofunctional (meth)acrylates, N-vinyl amides, N-acryloylamines, α,β-unsaturated ethers and mixtures thereof.

* * * * *